(12) United States Patent
Augusta et al.

(10) Patent No.: US 6,317,427 B1
(45) Date of Patent: Nov. 13, 2001

(54) METHOD AND APPARATUS FOR ADAPTIVE PORT BUFFERING

(75) Inventors: Stephen D. Augusta, Nashua; Benjamin J. Brown, Chichester; James E. Burgess, Northwood, all of NH (US)

(73) Assignee: Cabletron Systems, Inc., Rochester, NH (US)

( * ) Notice: Subject to any disclaimer, the term of this patent is extended or adjusted under 35 U.S.C. 154(b) by 0 days.

(21) Appl. No.: 08/847,344

(22) Filed: Apr. 24, 1997

(51) Int. Cl.[7] ................................... H04L 12/50
(52) U.S. Cl. ................... 370/357; 370/381; 711/101; 710/52
(58) Field of Search ................ 370/351, 357, 370/359, 360, 381, 382, 383, 230, 229, 315, 429; 395/200.53; 709/223; 710/52; 711/117, 101

(56) References Cited

U.S. PATENT DOCUMENTS

| | | | |
|---|---|---|---|
| 4,845,710 | * 7/1989 | Nakamura | 370/360 |
| 5,237,661 | * 8/1993 | Kawamura | 395/872 |
| 5,768,257 | * 6/1998 | Khacherian | 370/229 |
| 5,805,816 | * 9/1998 | Picazo | 370/230 |
| 5,872,822 | * 2/1999 | Bennett | 370/412 |

* cited by examiner

Primary Examiner—Douglas Olms
Assistant Examiner—Ricardo M. Pizarro
(74) Attorney, Agent, or Firm—Wolf, Greenfeld & Sacks, P.C.

(57) ABSTRACT

A data buffering storage circuit automatically allocates a portion of shared storage area to the direction in which data buffering is required. This scheme allows use of fewer parts on a piece of networking hardware, which in turn lowers the cost, simplifies the design, and uses existing on-board memory in a more efficient manner. In at least one embodiment, a first area is allocated to the buffering of a first port of a network switch, a second memory area is allocated to the buffering of a second port of the network switch, and a third area is shared among the buffering of the first port and the buffering of the second port.

78 Claims, 12 Drawing Sheets

METHOD AND APPARATUS FOR ADAPTIVE PORT BUFFERING

BACKGROUND OF THE INVENTION

1. Field of the Invention

The invention relates to a buffer device and methods for adaptively sharing memory area among a plurality of functions, for example as provided between a transmit buffer and a receive buffer on a communications network switch.

2. Description of the Prior Art

FIG. 1 is a block diagram of an exemplary network switch 10, which includes a network switch fabric 12, six input/output ports 14A–F, and six buffering and control circuits 16A–F. Each buffering and control circuit 16 is coupled between the switch fabric 12 and a corresponding one of the ports 14A–F. A network switch may have any number of ports, and may have its buffering and control functions either centralized, or distributed as shown in FIG. 1. In operation, data is received on one of the ports (e.g., port 14A) and a first corresponding buffering and control circuit (e.g., 16A) routes the communication data through the switch fabric 12 to a second buffering and control circuit (e.g., 16D) and to a second port (e.g., 14D).

FIG. 2 illustrates one known approach of buffering in a portion 20 of a communications network switch. A network port 24 is shown, coupled to the network switch fabric 22 via both receive buffer 26 and transmit buffer 28. Control circuitry for the port 24 is not shown. In this example, buffering for the port 24 is achieved by using physically separate memory devices, one for transmit (28) and the other for receive (26). This approach allows a designer of a network switch to maximize buffering in both transmit and receive directions for a given memory density, and achieve a minimum latency in accessing the data. It does, however, have a drawback in cost and port density—i.e., two buffer devices are required per port on the printed circuit board (PCB), making the PCB design more complex because of the additional real estate requirement, which in turn raises the cost. Another drawback is that when more devices are added for buffering, less room is available for actual network ports on the PCB.

FIG. 3 illustrates another approach to switch buffering for a portion 30 of a network switch, in which a single buffering device 35 is coupled between the network switch fabric 32 and a network port 34. A boundary 38 splitting the memory 34 in half (between transmit 37 and receive 36) is static; the boundary may be predetermined by PCB hardware, or may be predetermined by software. An advantage of this approach (over the design shown in FIG. 2) is that by using only one buffer device per port, the PCB design is simplified, and generally the cost lower. One disadvantage is that buffering is reduced to half of the amount provided by the technique shown in FIG. 2, assuming both designs use the same memory device. Thus, for the single memory device 34 to achieve the same level of buffering as buffers 26 and 28 of FIG. 2, twice as many devices would be needed, eliminating the advantage.

In yet another buffering scheme, a switch includes a mechanism which selects buffering to the predetermined highest load data stream, at the expense of any data stream having a lesser load. For example, it may be predetermined that twice as much receive buffering as transmit buffering, is desirable. Such a design based on the FIG. 2 embodiment would include a memory chip for the receive data that is twice the size of the memory chip used for the transmit data. To achieve the same result from the FIG. 3 embodiment, the boundary 38 would dedicate ⅔ of the device to receive data, and ⅓ to transmit data.

A significant disadvantage results from all of these prior approaches because an individual port in a network switch seldom requires transmit buffering and receive buffering simultaneously. Accordingly, when receive buffering is required, the memory dedicated to transmit buffering represents unused resources. The same is true when transmit buffering is required, but receive buffering is not. Thus, there is a basic inefficiency in the prior art designs.

There is another disadvantage with the switch that weights the buffer towards the direction of the predetermined higher load data stream. Data networks, by their very nature, are extremely non-deterministic, and thus it is difficult to determine what type of traffic will be generated when a device is introduced at a large number of different customer sites. If a memory boundary is placed in a less than optimal position with respect to how the port will utilize the buffer, there is a possibility that memory will be required but unavailable for a data stream in one direction, and memory will be available but not required for a data stream traveling in the other direction.

Thus, a need arises for an improved memory device and method of buffering data.

SUMMARY OF THE INVENTION

A buffer device in accordance with one embodiment of the invention, automatically allocates a portion of a shared buffering (storage) area to a direction in which data buffering is required. This feature enables use of fewer parts in a hardware network device, which in turn lowers the cost, simplifies the design, and utilizes existing memory in a more efficient manner.

According to a method embodiment, a first memory area is allocated to buffering of a first port of a network switch, a second memory area is allocated to buffering of a second port of the network switch, and a third area is allocated as being a shared storage for buffering of the first port and buffering of the second port.

The above-described device and method take advantage of the common situation in which a single port in a network subsystem seldom requires simultaneous buffering for data being transmitted and data being received. In contrast, current network hardware designs provide separate storage buffers for transmit and receive data. The Adaptive Port Buffering (APB) scheme of this invention allows a single memory area to be used for both transmit and receive data. At least one version of the technique assumes some minimum amount of storage area dedicated for transmit and receive buffering, and a large common area that both can use as necessary, then relinquish when no longer needed.

Another embodiment is directed to a method for using storage area within a buffer device. The method comprises the steps of: storing data in a portion of the buffer device; determining a last written location of the buffer device; reading at least part of the data from the portion of the buffer device; determining a last read location of the buffer device; determining whether a predetermined amount of space is available in the portion of the buffer device based upon the last read location; and when a predetermined amount of space is available, using at least some of the predetermined space to store new data received, and when the predetermined amount of space is not available, increasing an amount of the buffer device to be used as the storage area to a new amount and storing the new data received in the new amount.

In accordance with another aspect of the invention, an electronic data storage circuit comprises a first storage area of a first size, a second storage area of a second size, and a control circuit, coupled to the first storage area and the second storage area, the control circuit having an output that increases the size of the first storage area to a provide more storage space to a function that uses the first storage area.

In any of the above embodiments, a portion of a third buffer may be assigned to a first buffering function based upon a need for more buffering space by the first buffering function. Additionally, at least part of the third buffer area portion may be assigned to a second buffering function based upon a need for more buffering space by the second buffering function. Moreover, the need for more buffering space may be determined by detecting that less than a predetermined amount of currently unused space is available within a designated buffer area.

Still further, a first buffering function may use a first buffer area in a circular buffer scheme, having a first pointer indicative of a last written location and a second pointer indicative of a last read location; it may be determined that less than the predetermined amount of space is available based upon a value of the second pointer. Assigning a portion of a third buffer area may include incrementing the first pointer beyond the predetermined boundary of the first buffer area.

In at least one embodiment, the buffer device is a single memory chip within a communications network switch having a port that is coupled to a communications network. The first buffering function receives data from the communications network across the port, and the second buffering function receives data to be transmitted to the communications network across the port.

These and other features and benefits of the present invention will be more particularly described in the following detailed description.

DETAILED DESCRIPTION

The present invention takes advantage of an entire memory area by dividing the memory area into three sections: a transmit area; a receive area, and a shared area. Physically, the memory is separated, for example, with the transmit area at the bottom, the receive area at the top and the shared area between the other two. There may be only a small memory area reserved for each of the transmit and receive data, with the layer maintaining area shared by both data streams.

A significant advantage of such an embodiment over the previous designs is that for a given size memory device, buffer size is optimized, while on-board real estate requirements are minimized. Unlike previous designs, there is no hard-coded boundary between transmit and receive areas. At least one embodiment of the invention incorporates a "floating boundary" in the shared area of the memory, which allows a data stream that requires buffering beyond the minimum buffer to be utilized up to the reserved buffer space of the other stream.

Figure 1:
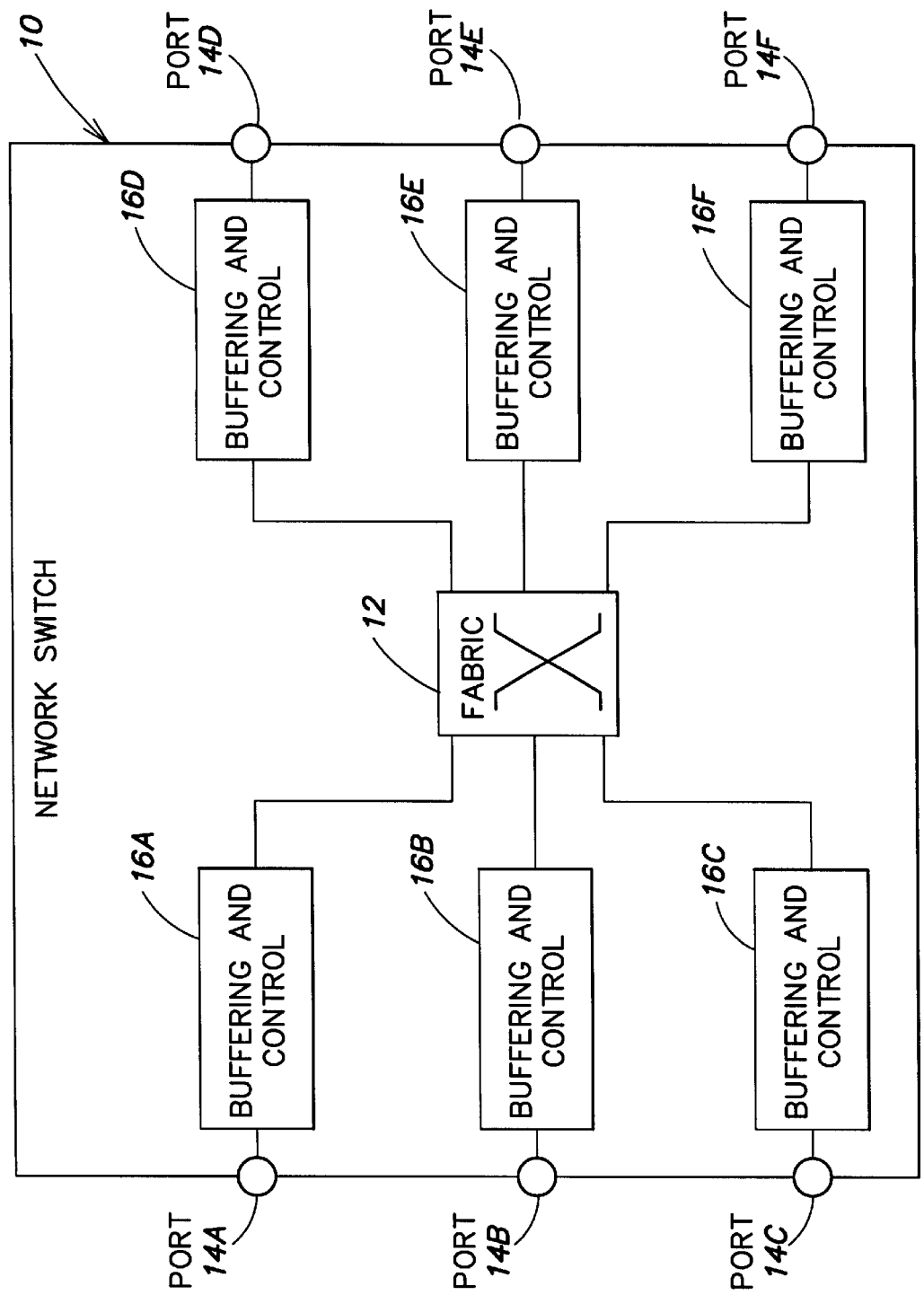
FIG. 1 is a block diagram of a network switch having a plurality of ports.
Figure 2:
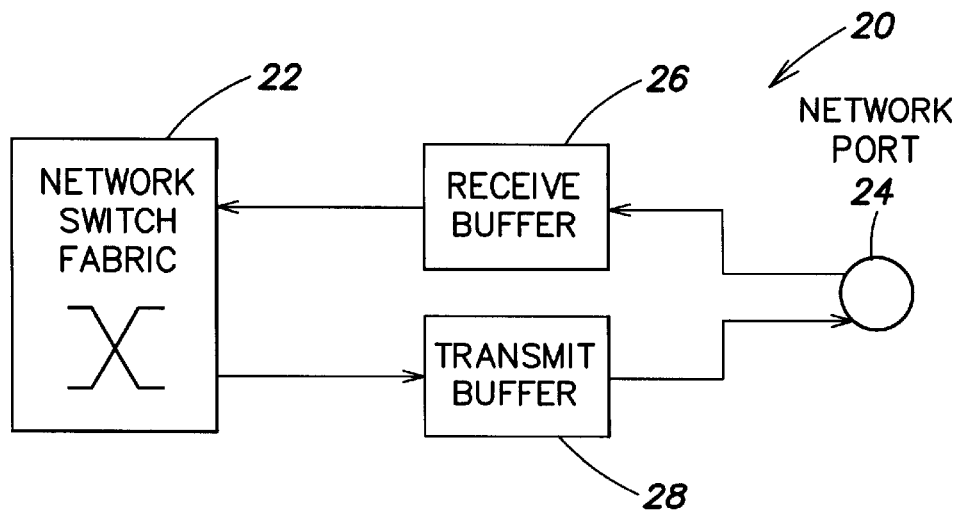
FIG. 2 is a functional diagram of a first prior art technique for providing buffering within a network switch.
Figure 3:
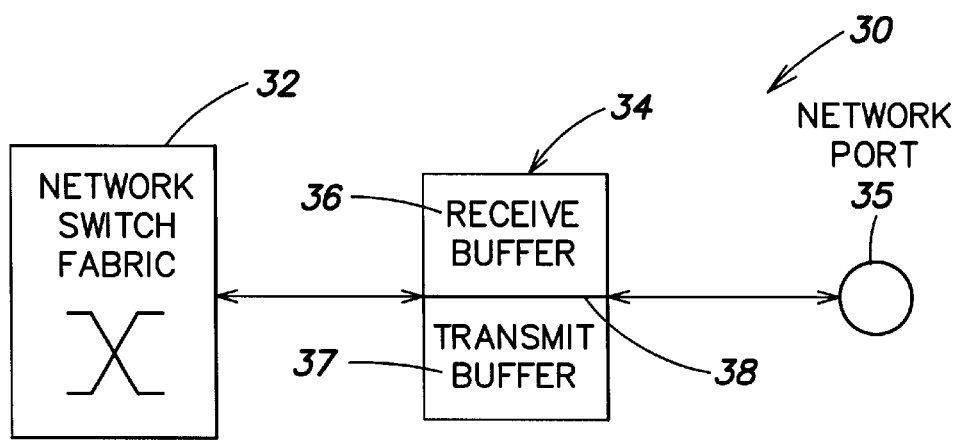
FIG. 3 is a functional diagram of a second prior art technique for providing buffering within a network switch.
Figure 4:
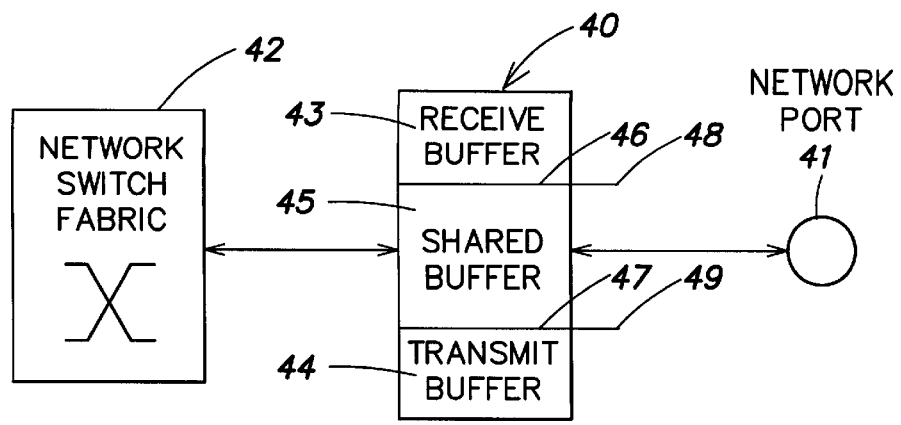
FIG. 4 is a functional diagram of a network switch having a receive buffer, a shared buffer, and a transmit buffer in accordance with an embodiment of the present invention.

FIG. 4 is a block diagram of an embodiment of the invention. FIG. 4 shows a buffer 40 that is coupled between a network switch fabric 42 and a network port 41. The buffer 40 includes a receive buffer area 43, a transmit buffer area 44, and a shared buffer area 45. The receive buffer area 43 is defined between a first end of the buffer 40 and a receive boundary 46, the transmit buffer area 44 is defined between a second end of the buffer 40 and a transmit boundary 47, and the shared buffer area 45 is the area between the receive boundary 46 and the transmit boundary 47. Initially, as shown in FIG. 4, the receive boundary 46 is located at some minimum predetermined receive boundary 48, and the transmit boundary 47 is located at some minimum predetermined transmit boundary 49.

Figure 5:
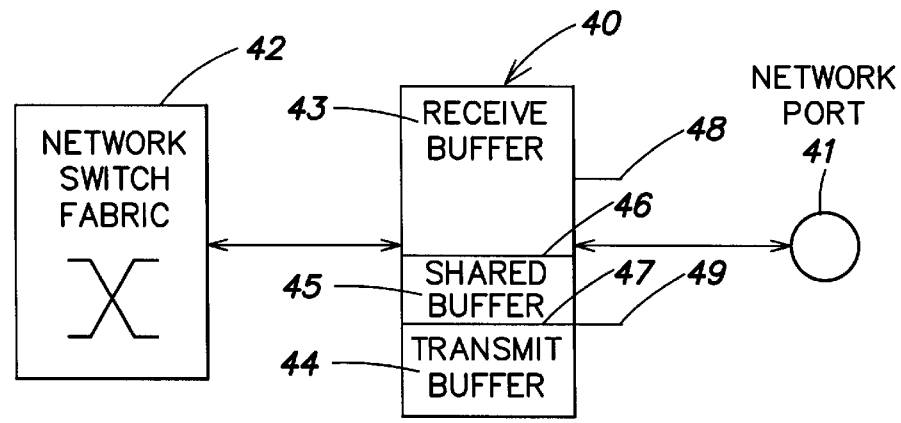
FIG. 5 shows the network switch buffer of FIG. 4, when the receive buffer has been expanded in size.

FIG. 5 shows the circuitry of FIG. 4 after the receive data stream (data received from the network port 41 to be communicated across the network switch fabric 42) has caused the minimum receive buffer size to be exceeded. In response, the embodiment shown in FIGS. 4–6 increases the size of the receive buffer 40 to allow more receive buffering. As indicated in FIG. 5, the receive boundary 46 has been moved into the portion of the buffer 40 that was previously the shared buffer area 45, so that the shared buffer area 45 is smaller and the receive buffer area 43 is larger. If desirable, the size of the receive buffer 43 may be increased to encompass all of the shared buffer area 45 (i.e., the receive boundary 46 may be moved all the way to the minimum transmit boundary 49).

Figure 6:
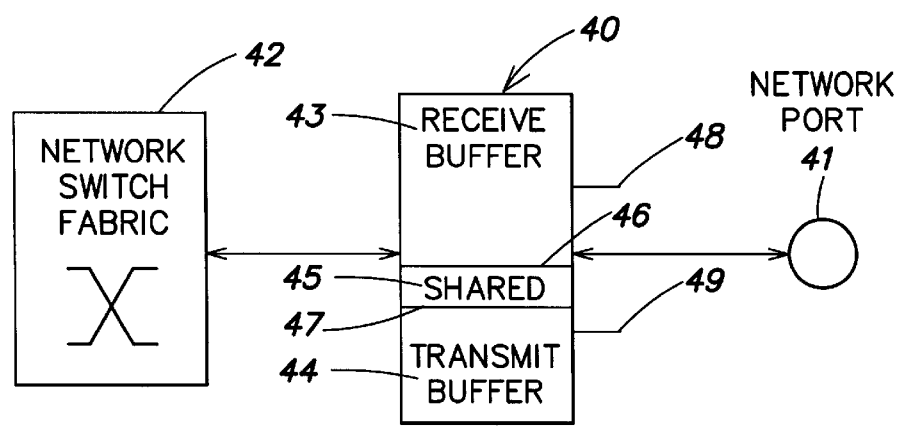
FIG. 6 shows the network switch buffer of FIG. 5, when the transmit buffer has been expanded in size.

In FIG. 6, both the transmit and receive data streams have exceeded their respective minimum buffer sizes. In particular, the receive boundary 46 has been moved to the same location as indicated in FIG. 5, and the transmit boundary 47 has also been moved into an area previously within the shared buffer area 45. This process may continue until there is no more shared area 45, because this area has been used up by both the receive buffer 43 and the transmit buffer 44. Additionally, if there is less receive buffer or transmit buffer area desired, either or both of the receive buffer area 43 and the transmit buffer area 44 may be decreased back to the original sizes shown in FIG. 4, or some other sizes. Thus, if the balance of transmit data with respect to buffer data changes over time, the buffer may be allocated and re-allocated to respond to the change in balance.

Figure 7:
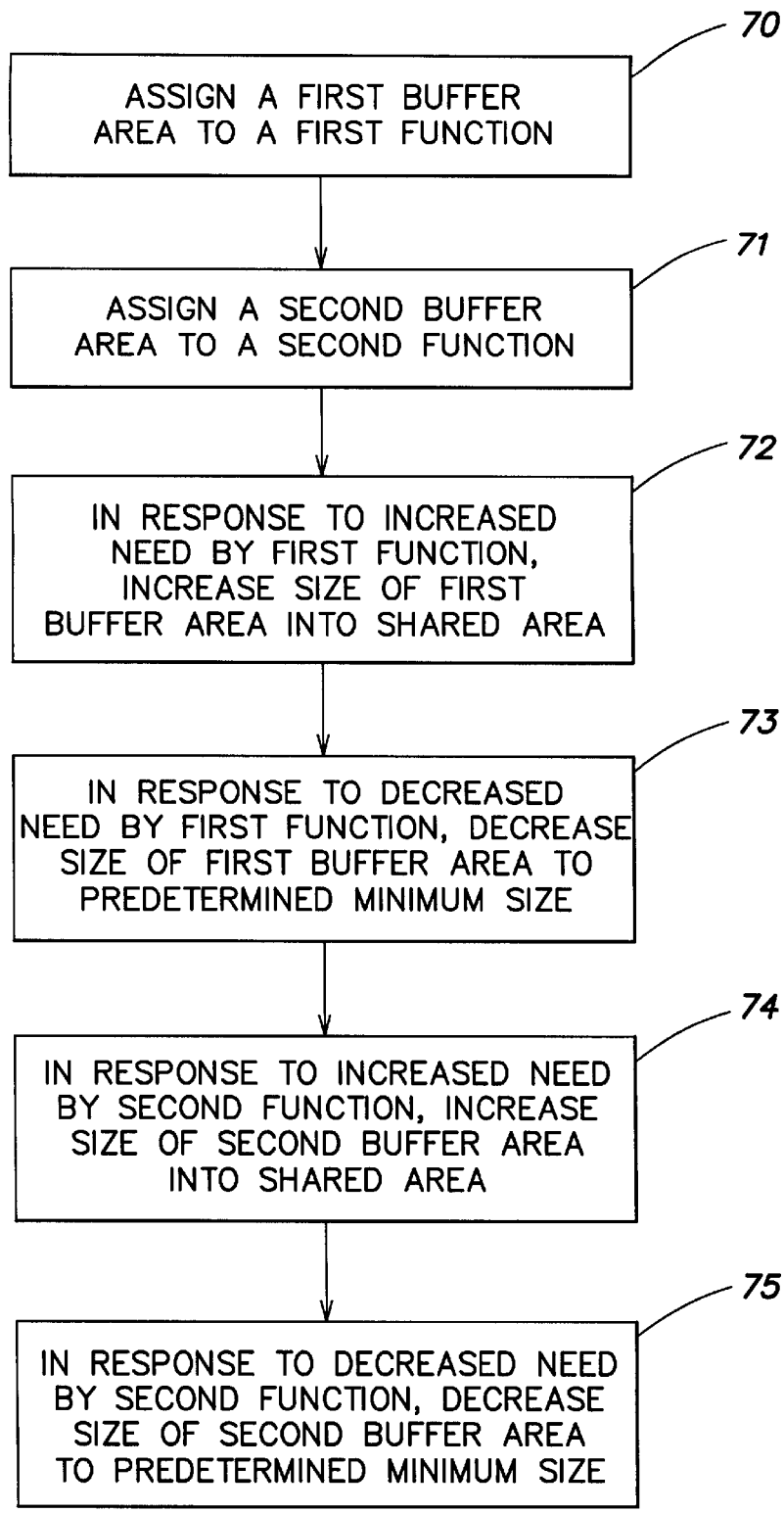
FIG. 7 is a high-level process flow diagram of an embodiment of the invention such as that shown in FIGS. 4–6.

FIG. 7 is a process flow diagram showing the operation of the embodiments shown in FIGS. 4–6. In step 70, a first buffer is assigned to a first function (e.g., a receive function), and in step 71 a second buffer is assigned to a second function (e.g., a transmit function). In step 72, an increased need for buffer space is detected for the first function, and in response the size of the first buffer area is increased into a shared area, as indicated in FIG. 5. After step 72, the size of the first buffer area may be decreased (step 73) in response to decreased need by the first function. Although it is not necessary, the size of the first buffer area may be decreased to a predetermined minimum size. Such a minimum buffer size may be used to guarantee that a particular size of an incoming data packet may be stored.

In step 74, the size of the second buffer area is increased into the shared area in response to an increased need by the second function. It is noted that this second buffer area may be expanded into a portion of the shared area that was previously occupied by the expanded first buffer area. Finally, in response to a decreased need by the second function, the size of the second buffer area may be decreased, possibly to a predetermined minimum size (step 75).

There are several ways to determine an increased or decreased need by either of the first and second functions. In at least one embodiment, a circular buffering scheme is employed, and periodically the amount of unused available space is evaluated to determine whether the buffer size should be increased.

Figure 8:
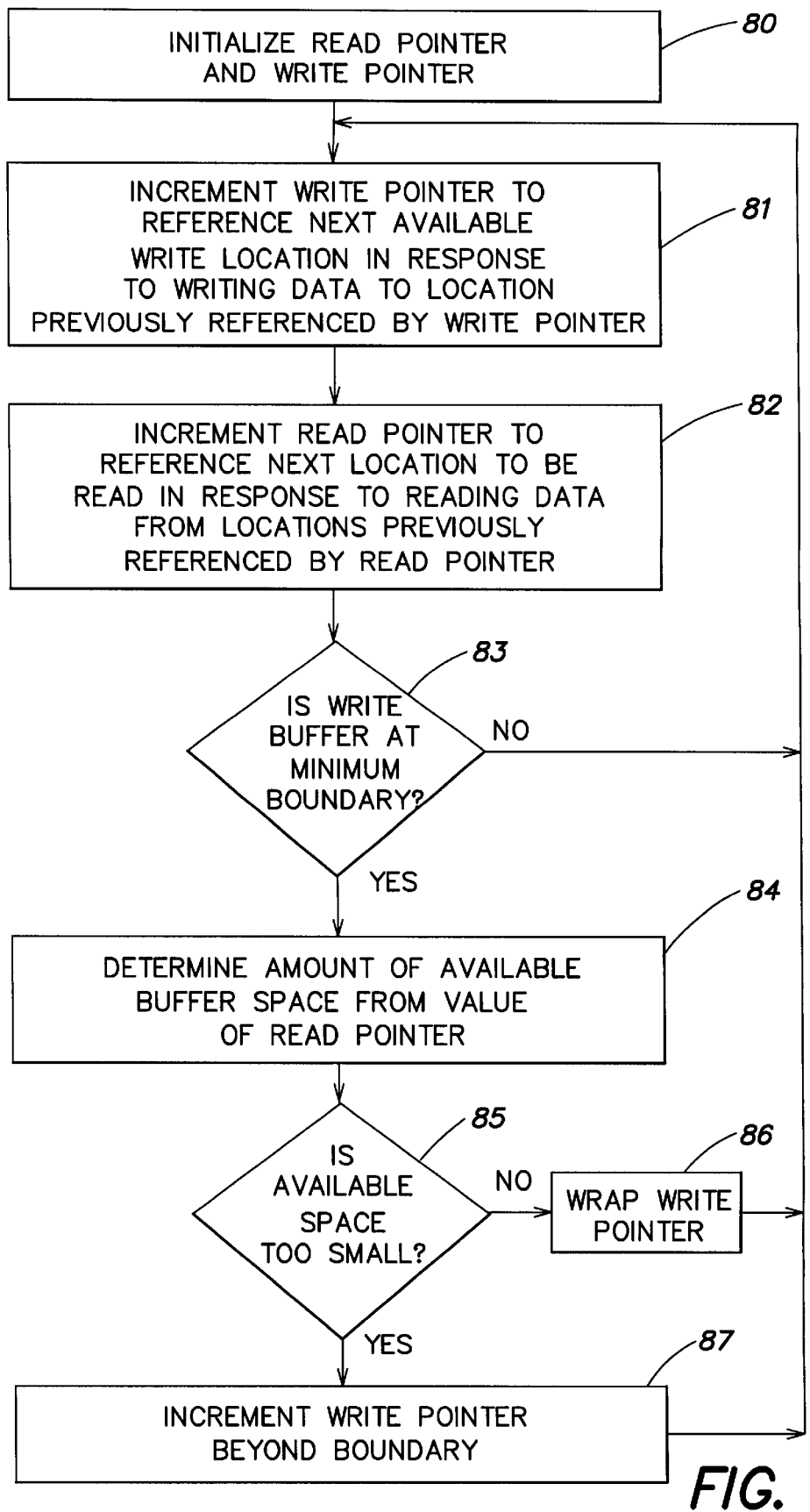
FIG. 8 is a process flow diagram of an embodiment of the invention in which a circular buffering scheme is implemented.
Figure 9:
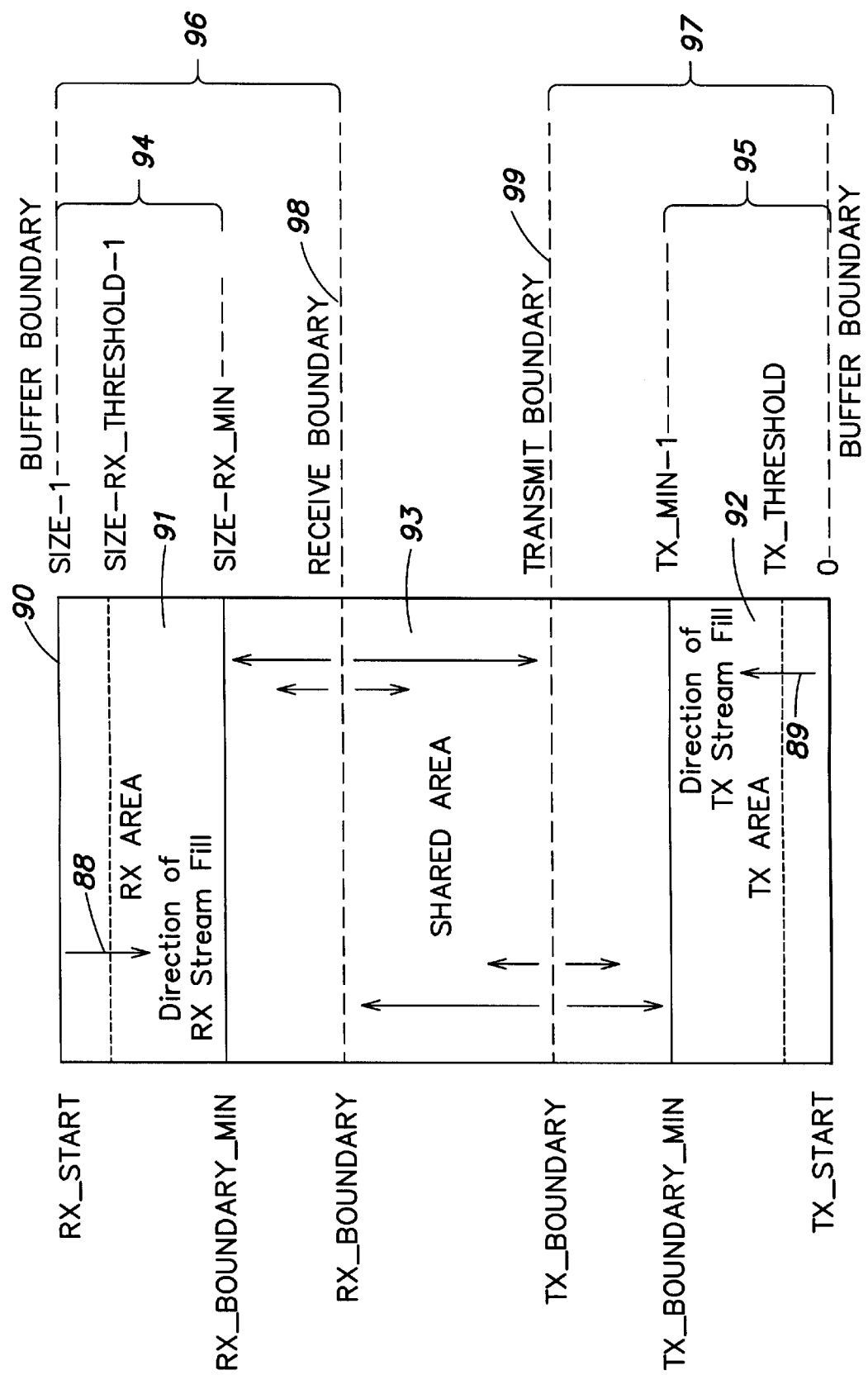
FIG. 9 is a memory map of a transmit/receive buffer for the embodiment shown in FIG. 8.

FIG. 8 is a process flow diagram for an embodiment which uses a circular buffering scheme; FIG. 9 is a memory map for such an embodiment of buffer 40. In general, a circular buffering scheme buffers data by storing initial data in a first location and additional data in locations that are increasingly greater distances from the first location. When the initial data from the first location is read, this location is "freed" for further storage of new data. A "write" pointer may be used to point to the next available location, which is initially the first location. The write pointer may then be incremented as data is stored. When the write pointer reaches the last location available to a particular function, the pointer is "wrapped" to the first location if the first location has been freed. Thus, a circular buffer may be used again and again. A "read" pointer may be used to indicate the next location to be read from. Thus, the size of the area between the read pointer and the write pointer is indicative of the total amount of data currently buffered.

In a circular buffer, the transmit buffer fills from the bottom of the buffer area up and the receive buffer fills from the top down. As either the transmit or receive area fills and approaches the respective boundary, a decision is made as to whether to wrap to the starting location or to push the boundary into the shared area, towards the other stream's boundary, which may also be extending into the first boundary. This decision may be based upon whether the data stream is being read out at a sufficient rate so that there is enough space available at a stream's start (bottom or top) to wrap and continue to write data, or if the stream decides there is not sufficient space at the start and wants to write more data into the shared area before wrapping. Typically, a data stream will use the shared area only when there is not enough space to continue writing if it wraps back to the start, although alternatives to this approach may be advantageous depending upon the particular buffering situation. After the buffer wraps around and the data from the shared area is read, the boundary is restored as close to the original location of the boundary as possible, dependent upon whether new data has been written beyond the original boundary.

The following examples illustrate how adaptive port buffering may be used when implemented on a networking device, although the concepts are applicable to any situation in which two or more functions share buffering space.

In step 80 (of FIG. 8), a read pointer and a write pointer are initialized. When a data word is received, it is written to the location referenced by the write pointer, and in response the write pointer is incremented (step 81). When resources are available to read data, data is read from the locations referenced by the read pointer, and in response the read pointer is incremented, Step 82. Step 81 may be repeated several times without step 82 being performed in the interim, and similarly step 82 may be repeated without step 81 being performed in the interim.

In step 83, the value of the write pointer is evaluated to determine whether the write buffer is at a minimum boundary. If it is not, then steps 81 and 82 are repeated as desired. If the write buffer is at the boundary, then the amount of available space is determined from the value of the read pointer (step 84). For example, if there were a total of 100 locations ranging from location values 0–99 in the initial buffer, then both the read and write pointers may be initialized to 0. If the write pointer reaches a value of 99 while the read pointer is only at location 10, this is an indication that there is only 10% available space, which may be considered too small. In such a situation, when data is to be written, it will be written to location 100, and the write pointer incremented accordingly, as indicated in step 87. Once the write pointer has been incremented beyond the boundary, steps 81 and 82 may be performed as desired. If the available space is not too small as determined in step 85, then the write pointer may be wrapped to the initial value, Step 86 (the location 0 in the example described above), and steps 81 and 82 performed as desired.

In the example shown in FIG. 8, the minimum boundary of step 83 does not change, although the actual size of the buffer area is increased when the write buffer exceeds this boundary. However, once the available space is sufficient (step 85), the write pointer is wrapped, so that once the read pointer is also wrapped, the size of the buffer is reduced to the size defined by the boundary.

The process shown in FIG. 8 may be performed to control either a transmit buffer or a receive buffer. For example, if the process is applied to a shared memory as shown in FIGS. 4–6, then the write pointer of the receive buffer 43 will be decremented in step 81 instead of incremented, because the receive buffer 43 will fill in a downward direction while the transmit buffer 44 will fill in an upward direction. Additionally, the read pointer is wrapped from whatever location the write pointer was previously wrapped.

FIG. 9 shows a memory map of addresses ranging from address 0 of one buffer boundary to address SIZE-1 of the other buffer boundary. The number SIZE defines the total number of words in the memory 90 allocated to buffering. This does not account for word size, because a word may have several bits of information, e.g., 8 bits or 16 bits in a typical application. In FIG. 9 the labels on the left-hand side designate variables and the labels on the right-hand side designate values.

In FIG. 9, the total memory area for the transmit buffer area, the receive buffer area, and the shared buffer area extends from location 0 to location SIZE-1. The receive buffer area 91 (RX AREA), which fills downwardly from the top in the direction of arrow 88, initially extends from location SIZE-1 to location SIZE-RX_MIN. Thus, variable RX_MIN defines the minimum number of memory words dedicated to the receive data stream. Similarly, the transmit buffer area 92 (TX AREA), which fills upwardly from the bottom in the direction of arrow 89, initially extends from location 0 to location TX_MIN-1, so that variable TX_MIN defines the minimum number of memory words dedicated to the transmit data stream. The minimum receive buffer area is indicated as 94 (the area between SIZE-1 and SIZE-RX_MIN), and the minimum transmit buffer area is indicated as 95 (the area between 0 and TX_MIN-1). The shared buffer area 93 (SHARED AREA) initially extends from location TX_MIN-1 to location SIZE-RX_MIN.

Also in FIG. 9, the current boundary 98 of the receive buffer area 91 is indicated by the variable RX_BOUNDARY (upper dashed line), so that the current receive buffer area is indicated as 96. Similarly, the current boundary of 99 the transmit buffer area 92 is indicated by the variable TX_BOUNDARY (lower dashed line), so that the current transmit buffer area is indicated as 97.

The variable SIZE—RX_THRESHOLD (upper dotted line) defines the minimum amount of receive buffer space available for the receive write pointer to be wrapped rather than extended into the shared area, when the receive write pointer has reached the boundary RX_BOUNDARY. In particular, the space from location SIZE-1 through SIZE-RX_THRESHOLD-1 must be available, as would be indicated by the read pointer pointing to a location that has a value that is less than SIZE-RX_THRESHOLD-1. Similarly, the value TX_THRESHOLD (lower dotted line) defines the amount of transmit buffer space which must be available for the transmit write buffer to be wrapped rather than extended into the shared area, when the transmit write pointer has reached the boundary TX_BOUNDARY.

In this embodiment, the variable RX_START has the value SIZE-1, and defines the wrap value for the RX_WRITE and RX_READ pointers, i.e., the value to which these pointers will be wrapped. Similarly, the variable TX_START has the value 0, and defines the wrap value for the TX_WRITE and TX_READ pointers.

Variable RX_BOUNDARY_MIN has the value SIZE-RX_MIN, and defines the maximum value for receive boundary 98, while variable TX_BOUNDARY_MIN has the value TX_MIN-1 and defines the minimum value for transmit boundary 99.

Variable RX_BOUNDARY, is initialized with the value SIZE-RX_MIN but can vary between its initial value and TX_MIN-1, which is the lower boundary 98 of the RX AREA, since going lower would extend into the minimum transmit area. For the transmit area, the variable TX_BOUNDARY is initialized with the value TX_MIN-1 but can vary between its initial value and SIZE-RX_MIN. Variable TX_BOUNDARY defines the upper boundary 99 of the TX AREA.

The receive write pointer is defined by variable RX_WRITE and is initialized with the value SIZE-1, but can vary between its initial value and RX_BOUNDARY. The variable RX_WRITE decrements whenever data from the receive stream is written to the memory. Upon reaching the RX_BOUNDARY into the shared area 93, the variable RX_WRITE is either wrapped to the value RX_START or is pushed to the next location in the shared area 93.

The receive read pointer is defined by variable RX_READ and is initialized with the value SIZE-1, but can vary between its initial value and RX_BOUNDARY; it decrements whenever data from the receive stream is read from the memory. Upon reaching the RX_BOUNDARY value, this pointer returns to RX_START and brings the RX_BOUNDARY back to RX_BOUNDARY_MIN or RX WRITE, whichever is lesser.

The transmit write pointer is defined by variable TX_WRITE, and is initialized with the value 0 but can vary between its initial value and TX_BOUNDARY. The variable TX_WRITE increments whenever data from the transmit stream is written to the memory. Upon reaching the TX_BOUNDARY VALUE, the transmit write pointer is either wrapped to the value TX_START or is pushed into the shared area 93, depending upon the current position of the transmit read pointer.

The transmit read pointer is defined by variable TX_READ and is initialized with the value 0, but can vary between its initial value and TX_BOUNDARY; it is incremented whenever data from the transmit stream is read from the memory. Upon reaching the TX_BOUNDARY value, transmit read pointer returns to TX_START and brings the TX_BOUNDARY back to TX_BOUNDARY_MIN or TX_WRITE, whichever is greater.

Figure 10:
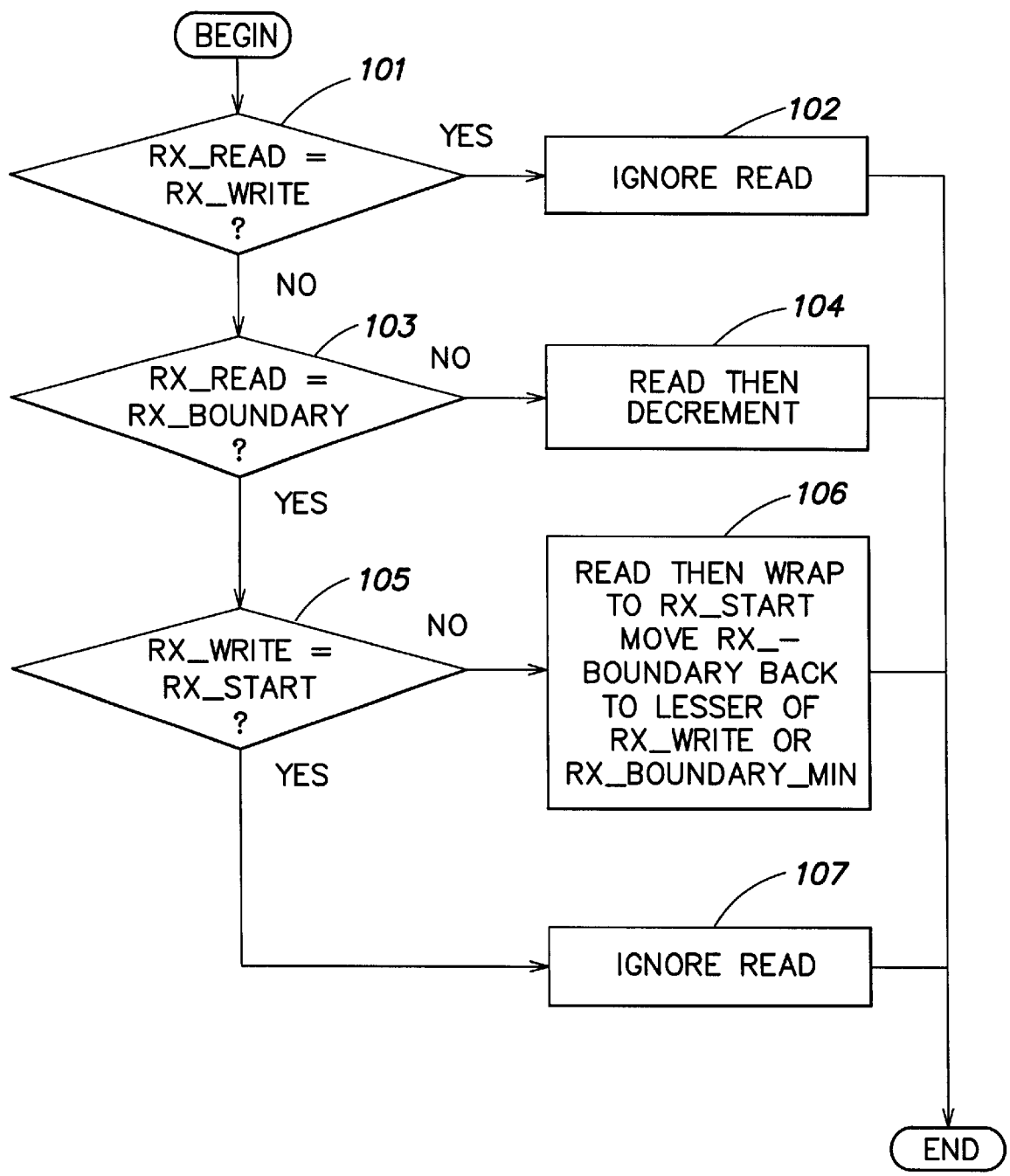
FIG. 10 is a detailed flowchart of a receive read process for the transmit/receive buffer of FIG. 8.

FIGS. 10–13 show the process flows associated with controlling the buffer 90 of FIG. 9. In particular, FIG. 10 shows the steps performed when data from the receive stream becomes available, by having been written into the receive buffer area 94. In step 101, if the receive read pointer RX_READ has a value that is equal to the value of the receive write pointer RX_WRITE, then no data is read (step 102), because the data is not yet available. Else, the value of RX_READ is evaluated to determine whether it is positioned at the boundary RX_BOUNDARY (step 103). If not, then the data at the location RX_READ is read and the receive read pointer RX_READ is decremented (step 104). If so, then the value of receive write pointer RX_WRITE is evaluated to determine whether it is located at location RX_START (step 105). If not, then the data is read, the receive read pointer RX_READ is wrapped to location RX_START, and the receive boundary RX_BOUNDARY is moved back to the lessor of value RX_WRITE and RX_BOUNDARY_MIN (step 106). This new location of boundary RX_BOUNDARY is representative of either the current location of write pointer RX_WRITE (if the write pointer has already extended into the shared area), or the minimum boundary (indicated by RX_BOUNDARY_MIN). If the value of RX_WRITE is equal to the value of RX_START as determined in step 105, then the read is ignored (step 107).

Figure 11:
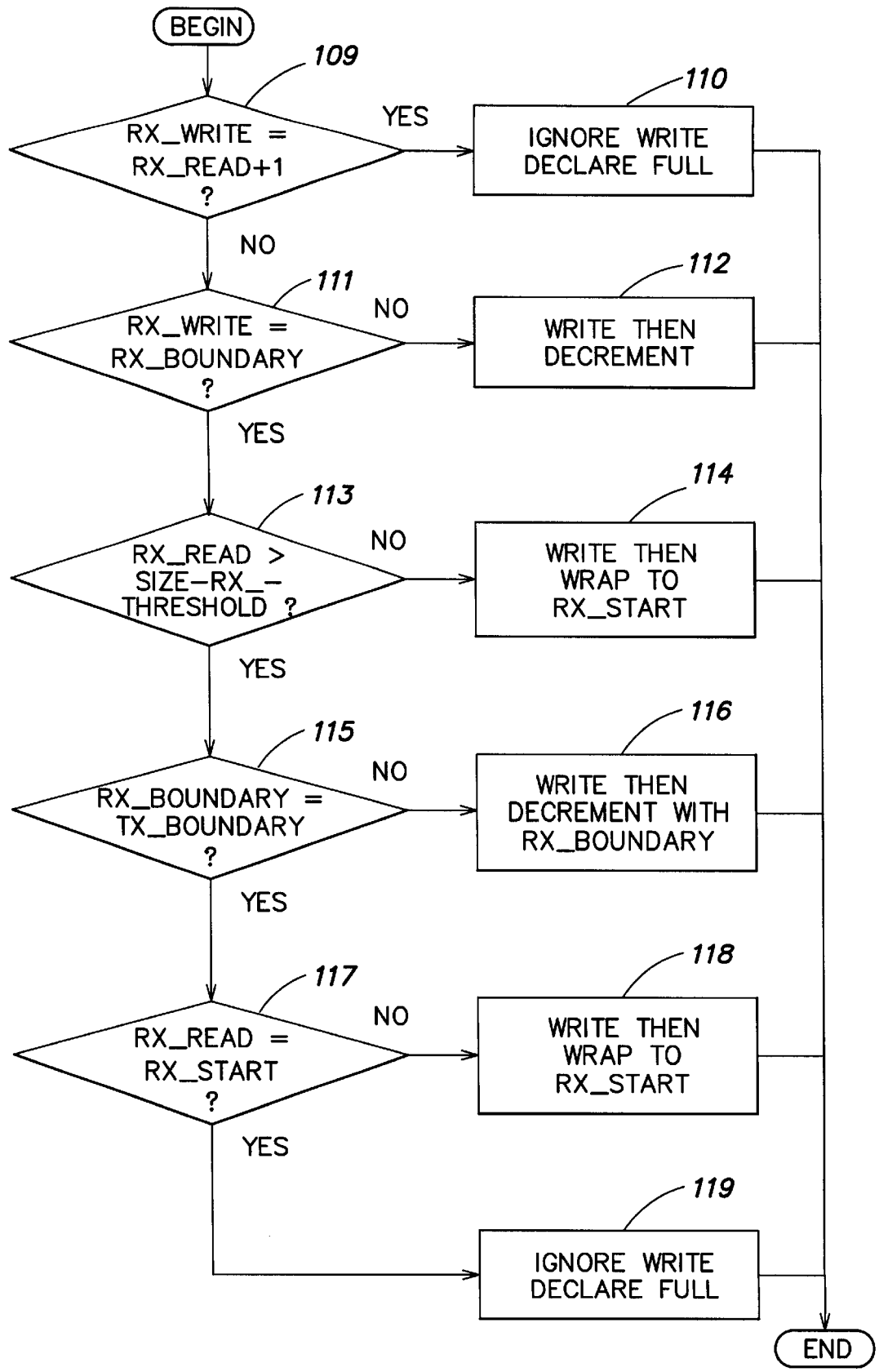
FIG. 11 is a detailed flowchart of a receive write process for the transmit/receive buffer of FIG. 8.

FIG. 11 shows a process for controlling the receive write pointer RX_WRITE in response to data being written into the receive buffer area 91. If the value of RX_WRITE is equal to one greater than the value of RX_READ (step 109), then the write is ignored and the receive buffer is declared full (step 110), because this situation indicates that the receive write pointer RX_WRITE has wrapped around and caught up with the receive read pointer RX_READ, so there is no more available receive buffer space. Else, if the receive write pointer RX_WRITE is not at the receive boundary RX_BOUNDARY (step 111), then the data is written and the value of RX_WRITE is decremented (step 112). If the receive write pointer RX_WRITE is at the receive boundary RX_BOUNDARY as determined in step 111, then RX_READ is evaluated to determine whether it has a value greater than SIZE-RX_THRESHOLD (step 113), which, if it does not, would be indicative that there is at least the minimum desirable receive buffer space since the area from SIZE-1 to SIZE-RX_THRESHOLD-1 is available. If so, the data is written and the receive write pointer RX_WRITE is wrapped to RX_START.

If the minimum desirable receive buffer space is not available as determined in step 113, then in step 115 it is determined whether the receive boundary RX_BOUNDARY is equal to the transmit boundary TX_BOUNDARY, which would be indicative that there is no more shared area available. If not, then the receive buffer area is extended into the shared area by writing the data to the location RX_WRITE and the receive boundary RX_BOUNDARY is decremented (step 116). Else, if the receive boundary is at the transmit boundary and the receive read pointer RX_READ is not equal to RX_START (step 117), then data is written to the location RX_WRITE and the receive write pointer RX_WRITE is wrapped to the value RX_START (step 118). In such an instance, since there is no more shared area into which the receive buffer can extend, the receive write pointer is wrapped even though there is currently less then the desired minimum space for the receive buffer. However, if the receive pointer RX_READ is equal to RX_START as indicated in step 117, this indicates that the receive buffer is full because the data at location RX_READ has not yet been removed from the receive buffer. Thus, the write is ignored and the receive buffer is declared as being full (step 119).

Figure 12:
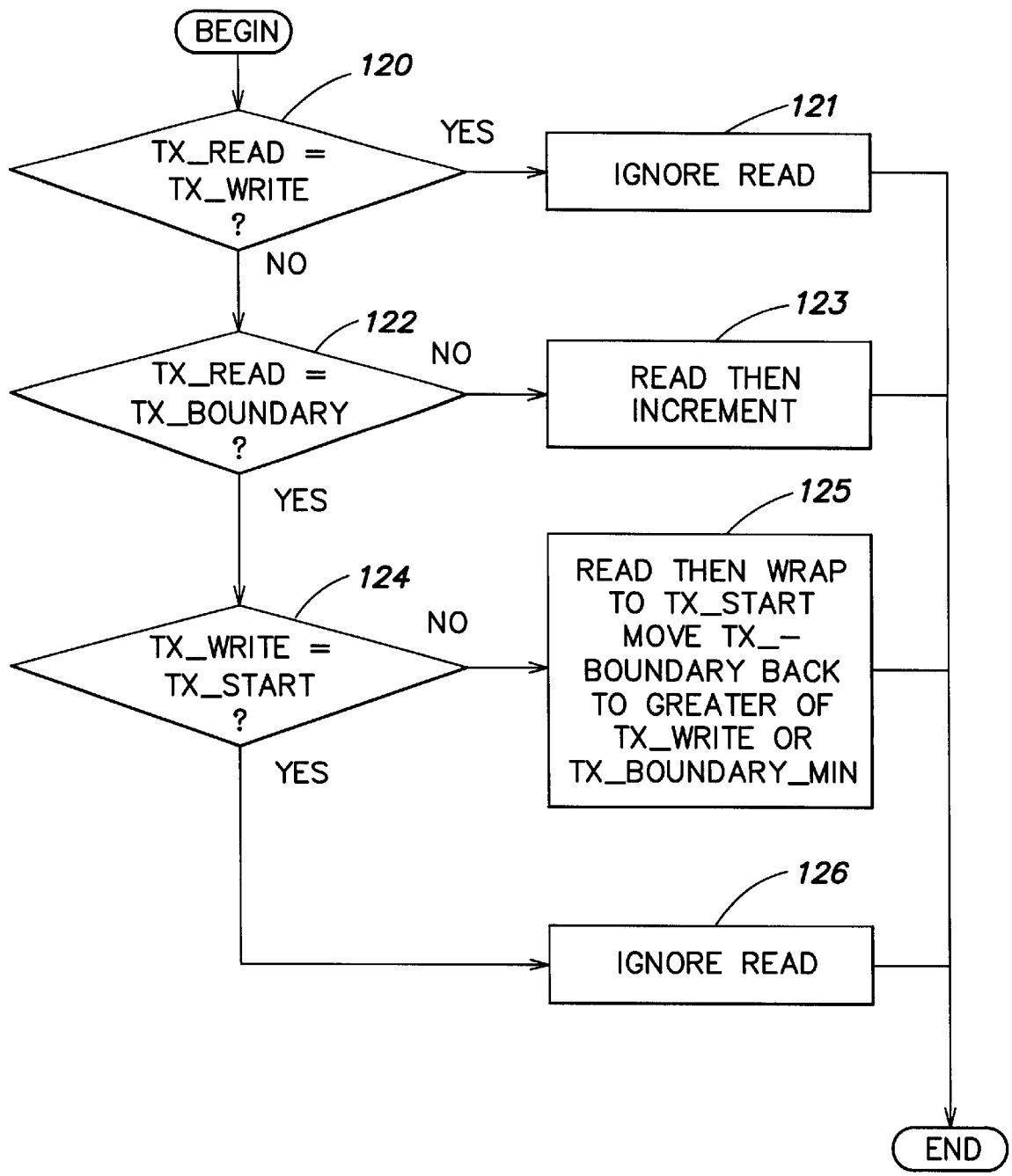
FIG. 12 is a detailed flowchart of a transmit read process for the transmit/receive buffer of FIG. 8.

FIG. 12 is a process flow diagram for a transmit read process. In step 120, it is determined whether transmit read pointer TX_READ has a value that is equal to the value of the transmit write pointer TX_WRITE, which would be indicative that the transmit read pointer TX_READ has caught up to the transmit write pointer TX_WRITE and therefore there is no new data to be read. If so, then the read is ignored in step 121. If not, then it is determined whether the transmit read pointer TX_READ is at the transmit boundary TX_BOUNDARY (step 122), and if not the data at location TX_READ is read and TX_READ is incremented (step 123). If TX_READ is equal to TX_BOUNDARY, then in step 124 the transmit write pointer TX_WRITE is evaluated to determine whether it is at location TX_START (step 124). If not, then the data at TX_READ is read, TX_READ is wrapped to TX_START, and the TX_BOUNDARY is moved back to the greater of TX_WRITE or TX_BOUNDARY_MIN (step 125). If TX_WRITE is at location TX_START, then the read is ignored (step 126).

Figure 13:
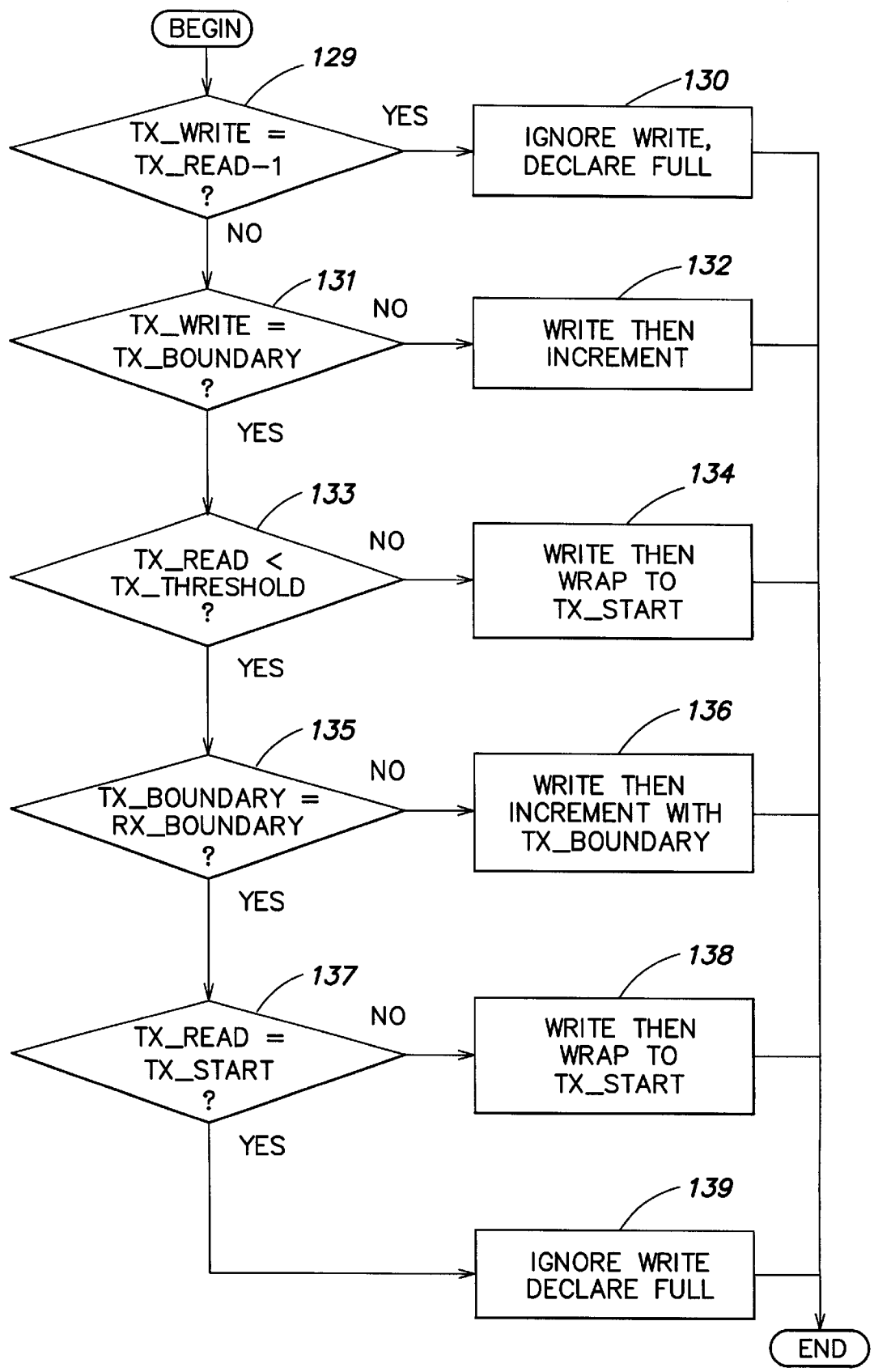
FIG. 13 is a detailed flowchart of a transmit write process for the transmit/receive buffer of FIG. 8.

FIG. 13 is a process flow diagram for a transmit write process. In step 129, it is determined whether the transmit write pointer TX_WRITE is equal to TX_READ-1. If so, then there is no more available transmit buffer space and therefore the data is not written and the transmit buffer is declared as being full (step 130). If not, then in step 131 it is determined whether TX_WRITE is at the transmit boundary TX_BOUNDARY (step 131), and if not the data is written and TX_WRITE is incremented (step 132). If so, then the desirable minimum transmit buffer space is evaluated by determining whether TX_READ is less than TX_THRESHOLD (step 133). If it is not, then the data is written and the transmit read pointer TX_READ is wrapped to TX_START (step 134). However, if the desirable minimum transmit buffer space is not available, then in step 135 it is determined whether the transmit boundary TX_BOUNDARY is already adjacent to the receive boundary RX_BOUNDARY, and if not the data is written and the transmit buffer area is extended into the shared area by incrementing TX_BOUNDARY (step 136). If the transmit boundary TX_BOUNDARY is already adjacent to the receive boundary RX_BOUNDARY and the transmit read pointer TX_READ is only at location TX_START (step 137), then the data is ignored and the transmit buffer is declared full (step 139). If the read pointer TX_READ is not at location TX_START, as determined in step 137, then the data is written and the transmit write pointer TX_WRITE is wrapped to TX_START, Step 138.

In the processes described above, the order and frequency of the data write and read requests is dependent upon system issues and may vary greatly. Additionally, it is not necessary to perform the steps of the disclosed processes in the same order as shown in the figures to attain the advantages of the embodiments of the invention.

Figure 14:
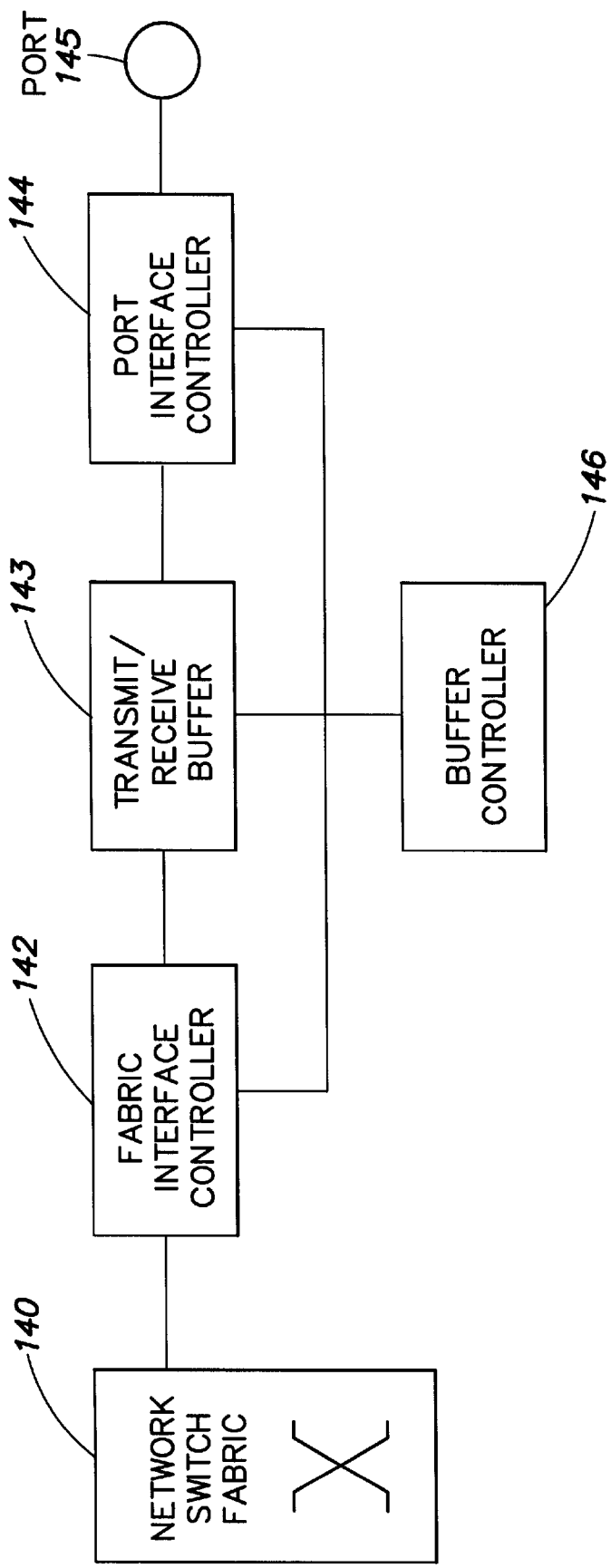
FIG. 14 is a block diagram of a portion of a network switch that interfaces with one port in accordance with at least one embodiment of the invention.

FIG. 14 is a block diagram of a portion of a network switch that interfaces with one port. In particular, FIG. 14 shows network switch fabric 140 coupled to fabric interface controller 142, which is further coupled to transmit/receive buffer 143. Port interface controller 144 is coupled between port 145 and transmit/receive buffer 143, and buffer controller 146 is coupled to each of the fabric interface controller 142, the transmit/receive buffer 143, and the port interface controller 144. Both the fabric interface controller 142 and the port interface controller 144 may be implemented as off-the-shelf devices, or may be integrated into an application specific integrated circuit (ASIC) that includes all or part of the blocks shown in FIG. 14. The transmit/receive buffer 143 may be a single dedicated memory device, several memory devices, or a portion of a total memory space used within the network switch.

In at least one embodiment, the buffer controller 146 performs the control functions described in FIGS. 7–13, by responding to requests from the fabric interface controller 142 and the port interface controller 144 and controlling the transmit/receive buffer 143 accordingly. In other embodiments, either or both of the fabric interface controller 142 and port interface controller 144 perform some or all of these control functions, so that a buffer controller is not necessary.

The embodiments of the network switch and buffering system described herein may be implemented in specially-designed hardware such as an ASIC, a state machine or other digital circuitry, or in any of several programming languages on a general purpose computer, or as a programmed general purpose computer itself.

Figure 15:
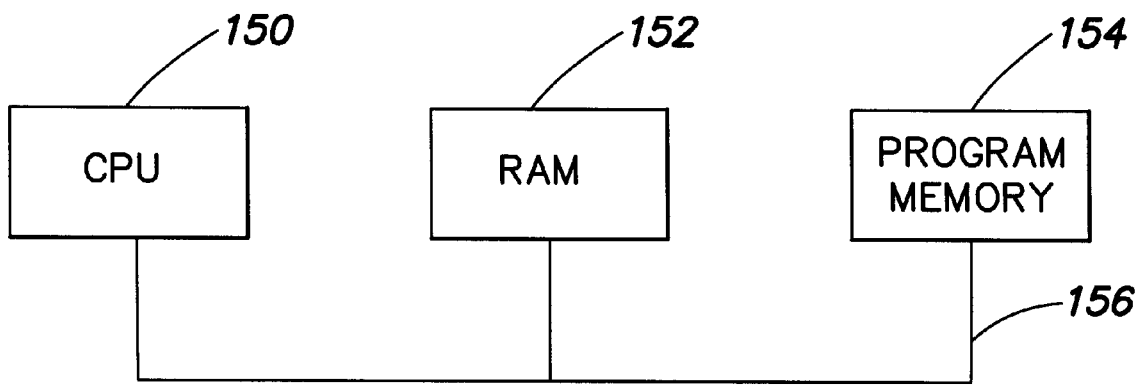
FIG. 15 is a block diagram of a general purpose computer which receives instructions for implementing at least one embodiment of the present invention.

For example, the techniques described in FIGS. 4–13 may be implemented as software on a floppy disk, compact disk, or hard drive, which controls a computer, for example a general purpose computer such as a workstation, a mainframe or a personal computer, to perform steps of the disclosed processes or to implement equivalents to the disclosed block diagrams. Such a general purpose computer (see for example FIG. 15) typically includes a central processing unit (CPU) 150 coupled to random access memory (RAM) 152 and program memory 154 via a data bus 156, which may also be coupled, for example, to the transmit/receive buffer. Additionally, in either a hardware or software embodiment, the functions performed by these different elements may be combined in varying arrangements of hardware and software.

Having thus described at least one illustrative embodiment of the invention, various modifications and improvements will readily occur to those skilled in the art and are intended to be within the scope of the invention. Accordingly, the foregoing description is by way of example only and is not intended as limiting.

What is claimed is:

1. A method of managing a buffer device to provide storage for a first buffering function and a second buffering function, the method comprising the steps of:
    assigning a first buffer area of the buffer device to the first buffering function, wherein the first buffer area is a circular buffer having a first pointer indicative of a last written location and a second pointer indicative of a last read location;
    assigning a second buffer area of the buffer device to the second buffering function;
    assigning a third buffer area of the buffer device to be shared between the first buffering function and the second buffering function;
    determining a need for more buffering space by the first buffering function by detecting that less than a predetermined amount of currently unused space is available within the first buffer area, wherein the step of detecting includes determining that less than the predetermined amount of space is available based upon the value of the second pointer; and
    assigning a first portion of the third buffer area to the first buffering function based upon the need for more buffering space by the first buffering function, wherein an amount of the third buffer area is assigned to the first buffer function in response to the value of the second pointer.

2. The method of claim 1, further comprising a step of assigning a second portion of the third buffer area to the second buffering function based upon a need for more buffering space by the second buffering function.

3. The method of claim 1, wherein:
    the step of determining includes performing the step of determining in response to detecting that the first pointer has been incremented to a value equal to a predetermined boundary of the first buffer area; and
    the step of assigning a portion of the third buffer area includes incrementing the first pointer beyond the predetermined boundary of the first buffer area.

4. The method of claim 1, wherein the buffer device is a single memory chip.

5. An electronic data storage circuit comprising:
    a first storage area of a first size, wherein the first storage area is a circular buffer having a first pointer indicative of a last written location and a second pointer indicative of a last read location;
    a second storage area of a second size; and
    means for increasing the size of the first storage area to provide more storage space to a function that uses the first storage area, wherein the means for increasing includes means for determining a need for more buffering space in the first storage area by detecting that less than a predetermined amount of currently unused space is available within the storage area,
    wherein the means for determining includes means for determining that less than the predetermined amount of currently unused space is available based upon the value of the second pointer.

6. The electronic data storage circuit of claim 5, further comprising means for decreasing the size of the first area to provide more storage space to a second function that uses the second storage area.

7. The electronic data storage circuit of claim 5, wherein the first size is equal to the second size.

8. An electronic data storage circuit comprising:
    a first storage area of a first size being used in a circular buffer scheme having a first pointer indicative of a last written location and a second pointer indicative of a last read location;
    a second storage area of a second size; and
    a control circuit, coupled to the first storage area and the second storage area, the control circuit including:
        a determining circuit that determines a need for more buffering space in the first storage area by detecting that less than the predetermined amount of currently unused space is available in the first storage area, wherein the determining circuit includes a detection circuit that detects that less than the predetermined amount of currently unused space is available based upon a value of the second pointer; and
    a first output that increases the size of the first storage area to provide more storage space to a function that uses the first storage area in response to the value of the second pointer.

9. The electronic data storage circuit of claim 8, wherein the control circuit further includes:
    a second output operative to decrease the first size to provide more storage space to a second function that uses the second storage area.

10. The electronic data storage circuit of claim 8, wherein the first size is equal to the second size.

11. An apparatus for managing a buffer device to provide storage for a first buffering function and a second buffering function, the apparatus comprising:
    means for assigning a first buffer area of the buffer device to the first buffering function;
    means for assigning a second buffer area of the buffer device to the second buffering function;
    means for assigning a third buffer area of the device to be shared between the first buffering function and the second buffering function, including means for assigning a portion of the third buffer area to the first buffering function based upon a need for more buffering space by the first buffering function; and
    means for re-assigning at least part of the portion of the third buffer area to the second buffering function based upon a need for more buffering space by the second buffering function.

12. An apparatus for managing a buffer device to provide storage for a first buffering function and a second buffering function, the apparatus comprising:
    means for assigning a first buffer area of the buffer device to the first buffering function;
    means for assigning a second buffer area of the buffer device to the second buffering function;
    means for assigning a third buffer area of the device to be shared between the first buffering function and the second buffering function, including means for assigning a first portion of the third buffer area to the first buffering function based upon a need for more buffering space by the first buffering function; and
    means for determining the need for more buffering space by the first buffering function by detecting that less than a predetermined amount of currently unused space is available within the first buffer area.

13. The apparatus of claim 12, wherein:

the first buffering function uses the first buffer area in a circular buffer scheme having a first pointer indicative of a last written location ad a second pointer indicative of a last read location;

the means for detecting includes means for determining that less than the predetermined amount of currently unused space is available based upon a value of the second pointer.

14. The apparatus of claim 13, wherein means for detecting includes:

means for detecting that the first pointer has been incremented to a value equal to a predetermined boundary of the first buffer area; and the means for assigning a portion of the third buffer area includes means for incrementing the first pointer beyond the predetermined boundary of the first buffer area.

15. The apparatus of claim 11, wherein:

the buffer device is a single memory chip.

16. The method of claim 2, wherein at least a part of the second portion is also at least a part of the first portion such that the act of assigning a second portion includes:

re-assigning the part to the second buffering function.

17. The method of claim 4, wherein:

the single memory chip is within a communications network switch having a port that is coupled to a communications network;

the first buffering function receives data from the communications network across the port; and the second buffering function receives data to be transmitted to the communications network across the port.

18. The method of claim 1, wherein:

the buffering device is part of a communications network switch having a port that is coupled to a communications network;

the first buffering function receives data from a communications network across the port; and the second buffering function receives data to be transmitted to the communications network across the port.

19. The electronic data storage circuit of claim 5, wherein the first and second storage areas are a single memory chip.

20. The electronic data storage circuit of claim 19, wherein:

the single memory chip is part of a communications network switch having a port that is coupled to a communications network;

the first storage area is operative to receive data from the communications network across the port; and the second storage are is operative to receive data to be transmitted to the communications network across the port.

21. The method of claim 5, wherein:

the electronic data storage circuit is part of a communications network switch having a port that is coupled to a communications network;

the first buffering area is operative to receive data from a communications network across the port; and the second buffering area is operative to receive data to be transmitted to the communications network across the port.

22. The electronic data storage circuit of claim 8, wherein the first and second storage areas are a single memory chip.

23. The electronic data storage circuit of claim 22, wherein:

the single memory chip is part of a communications network switch having a port that is coupled to a communications network;

the first storage area is operative to receive data from the communications network across the port; and the second storage are is operative to receive data to be transmitted to the communications network across the port.

24. The method of claim 8, wherein:

the electronic data storage circuit is part of a communications network switch having a port that is coupled to a communications network;

the first buffering area is operative to receive data from a communications network across the port; and the second buffering area is operative to receive data to be transmitted to the communications network across the port.

25. The apparatus of claim 15, wherein:

the single memory chip is within a communications network switch having a port that is coupled to a communications network;

the first buffering function receives data from the communications network across the port; and the second buffering function receives data to be transmitted to the communications network across the port.

26. The apparatus of claim 11, wherein:

the buffer device is part of a communications network switch having a port that is coupled to a communications network;

the first buffering function receives data from the communications network across the port; and the second buffering function receives data to be transmitted to the communications network across the port.

27. The apparatus of claim 11, further comprising:

means for determining the need for more buffering space by the first buffering function by detecting that less than a predetermined amount of currently unused space is available within the first buffer area.

28. The apparatus of claim 27, wherein:

the first buffering function uses the first buffer area in a circular buffer scheme having a first pointer indicative of a last written location ad a second pointer indicative of a last read location; and the means for determining includes means for determining that less than the predetermined amount of currently unused space is available based upon a value of the second pointer.

29. The apparatus of claim 28, wherein:

the means for determining includes means for detecting that the first pointer has been incremented to a value equal to a predetermined boundary of the first buffer area; and the means for assigning a portion of the third buffer area includes means for incrementing the first pointer beyond the predetermined boundary of the first buffer area.

30. The apparatus of claim 12, wherein:

the buffer device is a single memory chip.

31. The apparatus of claim 30, wherein:

the single memory chip is within a communications network switch having a port that is coupled to a communications network;

the first buffering function receives data from the communications network across the port; and the second buffering function receives data to be transmitted to the communications network across the port.

32. The apparatus of claim 12, wherein:

the buffer device is part of a communications network switch having a port that is coupled to a communications network;

the first buffering function receives data from the communications network across the port; and the second buffering function receives data to be transmitted to the communications network across the port.

33. The method of claim 12, further comprising:

means for assigning a second portion of the third buffer area to the second buffering function based upon a need for more buffering space by the second buffering function.

34. The method of claim 33, wherein at least a part of the second portion is also at least a part of the first portion such that the means for assigning a second portion of the third buffer area includes:

means for re-assigning the part to the second buffering function.

35. A method of managing a buffer device to provide storage for a first buffering function and a second buffering function, the method comprising acts of:

assigning a first buffer area of the buffer device to the first buffering function, wherein the first buffer area is a circular buffer having a first pointer indicative of a last written location and a second pointer indicative of a last read location;

assigning a second buffer area of the buffer device to the second buffering function;

assigning a third buffer area of the buffer device to be shared between the first buffering function and the second buffering function; and assigning a first portion of the third buffer area to provide storage for the first buffering function based upon a need for more buffering space by the first buffering function.

36. The method of claim 35, further comprising an act of:

assigning a second portion of the third buffer area to provide storage for the second buffering function based upon a need for more buffering space by the second buffering function.

37. The method of claim 36, wherein at least a part of the second portion is also at least a part of the first portion such that the act of assigning a second portion of the third buffer area includes:

re-assigning the part to the second buffering function.

38. The method of claim 36, further comprising an act of:

determining the need for more buffering space by the first buffering function by detecting that less than a predetermined amount of currently unused space is available within the first buffer area.

39. The method of claim 38, wherein:

the first buffering function uses the first buffer area in a circular buffer scheme having a first pointer indicative of a last written location ad a second pointer indicative of a last read location; and the act of determining includes detecting that less than the predetermined amount of currently unused space is available based upon a value of the second pointer.

40. The method of claim 39, wherein:

detecting includes determining that the first pointer has been incremented to a value equal to a predetermined boundary of the first buffer area; and the act of assigning a portion of the third buffer area includes incrementing the first pointer beyond the predetermined boundary of the first buffer area.

41. The method of claim 35, wherein the buffer device is a single memory chip.

42. The method of claim 41, wherein:

the single memory chip is within a communications network switch having a port that is coupled to a communications network;

the first buffering function receives data from the communications network across the port; and the second buffering function receives data to be transmitted to the communications network across the port.

43. The method of claim 35, wherein:

the buffer device is part of a communications network switch having a port that is coupled to a communications network;

the first buffering function receives data from the communications network across the port; and the second buffering function receives data to be transmitted to the communications network across the port.

44. The method of claim 35, further comprising an act of:

determining the need for more buffering space by the first buffering function by detecting that less than a predetermined amount of currently unused space is available within the first buffer area.

45. The method of claim 44, wherein:

the first buffering function uses the first buffer area in a circular buffer scheme having a first pointer indicative of a last written location ad a second pointer indicative of a last read location; and the act of determining includes detecting that less than the predetermined amount of currently unused space is available based upon a value of the second pointer.

46. The method of claim 45, wherein:

detecting includes determining that the first pointer has been incremented to a value equal to a predetermined boundary of the first buffer area; and assigning a portion of the third buffer area includes incrementing the first pointer beyond the predetermined boundary of the first buffer area.

47. The method of claim 44, wherein the buffer device is a single memory chip.

48. The method of claim 47, wherein:

the single memory chip is within a communications network switch having a port that is coupled to a communications network;

the first buffering function receives data from the communications network across the port; and the second buffering function receives data to be transmitted to the communications network across the port.

49. The method of claim 44, wherein:

the buffer device is part of a communications network switch having a port that is coupled to a communications network;

the first buffering function receives data from the communications network across the port; and the second buffering function receives data to be transmitted to the communications network across the port.

50. The method of claim 44, further comprising an act of:

assigning a second portion of the third buffer area to provide storage for the second buffering function based upon a need for more buffering space by the second buffering function.

51. The method of claim 50, wherein at least a part of the second portion is also at least a part of the first portion such that the act of assigning a second portion of the third buffer area includes:
  re-assigning the part to the second buffering function.

52. An electronic data storage system, comprising:
  a buffering device, including:
    a first buffer area to provide storage for a first buffering function;
    wherein the first buffer area is a circular buffer having a first pointer indicative of a last written location and a second pointer indicative of a last read location;
    a second buffer area to provide storage for a second buffering function; and
    a third buffer area to provide storage and to be shared between the first buffering function and the second buffering function; and
  a control circuit, connected to the buffer device, to assign a portion of the third buffer area to the first buffering function based upon a need for more buffering space by the first buffering function.

53. The electronic data storage system of claim 49, wherein the control circuit is further operative to assign a second portion of the third buffer area to provide storage for the second buffering function based upon a need for more buffering space by the second buffering function.

54. The electronic data storage system of claim 53, wherein at least a part of the second portion is also at least a part of the first portion such that the part is re-assigned to the second buffering function.

55. The system of claim 53, wherein the control circuit is further operative to determine the need for more buffering space by the first buffering function by detecting that less than a predetermined amount of currently unused space is available within the first buffer area.

56. The system of claim 55, wherein:
  the first buffering function uses the first buffer area in a circular buffer scheme having a first pointer indicative of a last written location ad a second pointer indicative of a last read location; and
  the control circuit is further operative, as part of determining, to detect that less than the predetermined amount of currently unused space is available based upon a value of the second pointer.

57. The system of claim 56, wherein the control circuit is further operative:
  as part of detecting, to determine that the first pointer has been incremented to a value equal to a predetermined boundary of the first buffer area; and
  as part of assigning a portion of the third buffer area, to increment the first pointer beyond the predetermined boundary of the first buffer area.

58. The system of claim 52, wherein the buffer device is a single memory chip.

59. The system of claim 58, wherein:
  the single memory chip is within a communications network switch having a port that is coupled to a communications network;
  the first buffering function receives data from the communications network across the port; and
  the second buffering function receives data to be transmitted to the communications network across the port.

60. The system of claim 52, wherein:
  the buffer device is part of a communications network switch having a port that is coupled to a communications network;
  the first buffering function receives data from the communications network across the port; and
  the second buffering function receives data to be transmitted to the communications network across the port.

61. The electronic data storage system of claim 49, wherein the control circuit is operative to determine a need for more buffering space by the first buffering function by detecting that less than a predetermined amount of currently unused space is available within the first buffer area.

62. The system of claim 61, wherein:
  the first buffering function uses the first buffer area in a circular buffer scheme having a first pointer indicative of a last written location ad a second pointer indicative of a last read location; and
  the control circuit is operative, as part of determining, to detect that less than the predetermined amount of currently unused space is available based upon a value of the second pointer.

63. The system of claim 62, wherein the control circuit is operative:
  as part of detecting, to determine that the first pointer has been incremented to a value equal to a predetermined boundary of the first buffer area; and
  as part of assigning a portion of the third buffer area, to increment the first pointer beyond the predetermined boundary of the first buffer area.

64. The system of claim 61, wherein the buffer device is a single memory chip.

65. The system of claim 64, wherein:
  the single memory chip is within a communications network switch having a port that is coupled to a communications network;
  the first buffering function receives data from the communications network across the port; and
  the second buffering function receives data to be transmitted to the communications network across the port.

66. The system of claim 61, wherein:
  the buffer device is part of a communications network switch having a port that is coupled to a communications network;
  the first buffering function receives data from the communications network across the port; and
  the second buffering function receives data to be transmitted to the communications network across the port.

67. The system of claim 61, wherein the control circuit is further operative to assign a second portion of the third buffer area to provide storage for the second buffering function based upon a need for more buffering space by the second buffering function.

68. The system of claim 67, wherein at least a part of the second portion is also at least a part of the first portion such that the part is re-assigned to the second buffering function.

69. The system of claim 52, wherein the control circuit is a buffer controller.

70. The system of claim 52, wherein the control circuit is one of the following:
  a fabric interface controller, a port interface controller, or a combination thereof.

71. A system for managing a buffer device to provide storage for a first buffering function and a second buffering function, the system comprising:
  means for assigning a first buffer area of the buffer device to the first buffering function, wherein the first buffer area is a circular buffer having a first pointer indicative of a last written location and a second pointer indicative of a last read location;

means for assigning a second buffer area of the buffer device to the second buffering function;

means for assigning a third buffer area of the buffer device to be shared between the first buffering function and the second buffering function; and means for assigning a first portion of the third buffer area to provide storage for the first buffering function based upon a need for more buffering space by the first buffering function.

72. The system of claim 71, further comprising:

means for assigning a second portion of the third buffer area to provide storage for the second buffering function based upon a need for more buffering space by the second buffering function.

73. The system of claim 72, further comprising:

means for determining the need for more buffering space by the first buffering function by detecting that less than a predetermined amount of currently unused space is available within the first buffer area.

74. The system of claim 73, wherein:

the first buffering function uses the first buffer area in a circular buffer scheme having a first pointer indicative of a last written location ad a second pointer indicative of a last read location; and the means for determining includes means for detecting that less than the predetermined amount of currently unused space is available based upon a value of the second pointer.

75. The system of claim 74, wherein:

the means for detecting includes means for determining that the first pointer has been incremented to a value equal to a predetermined boundary of the first buffer area; and the means for assigning a portion of the third buffer area includes means for incrementing the first pointer beyond the predetermined boundary of the first buffer area.

76. The system of claim 71, wherein the buffer device is a single memory chip.

77. The system of claim 76, wherein:

the single memory chip is within a communications network switch having a port that is coupled to a communications network;

the first buffering function receives data from the communications network across the port; and the second buffering function receives data to be transmitted to the communications network across the port.

78. The system of claim 71, wherein:

the buffer device is part of a communications network switch having a port that is coupled to a communications network;

the first buffering function receives data from the communications network across the port; and the second buffering function receives data to be transmitted to the communications network across the port.

\* \* \* \* \*